R. B. WHEELER.

Improvement in Baskets.

No. 5,332. Reissued March 18, 1873.

Witnesses.

Henry Michael
Robert Watson

Inventor.

Rancoe B. Wheeler

UNITED STATES PATENT OFFICE.

ROSCOE B. WHEELER, OF DOWAGIAC, MICHIGAN, ASSIGNOR OF ONE-HALF INTEREST TO HENRY LARDNER.

IMPROVEMENT IN BASKETS.

Specification forming part of Letters Patent No. 132,703, dated October 29, 1872; reissue No. 5,332, dated March 18, 1873.

*To all whom it may concern:*

Be it known that I, ROSCOE B. WHEELER, of Dowagiac, in the county of Cass and State of Michigan, have invented certain Improvements in Baskets, of which the following is a specification:

The nature of this invention relates to a new combination of staves and hoops employed in constructing baskets where more than one series of staves are employed; the object being to produce, as far as is practicable, a basket possessing the greatest utility with the least expense of production. To accomplish these purposes, I construct a basket as set forth in the following specification, of which the accompanying drawing forms a part.

The letters of reference marked thereon indicate the parts referred to by a similar letter in the written part of this specification.

Figure 1:
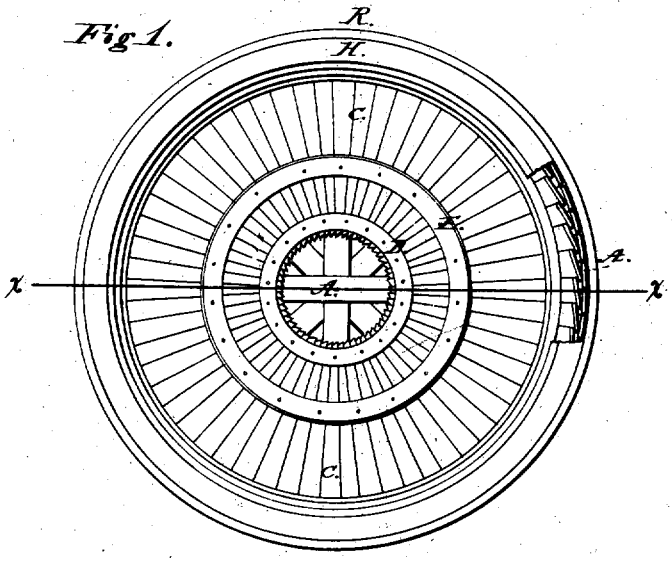
Figure 2:
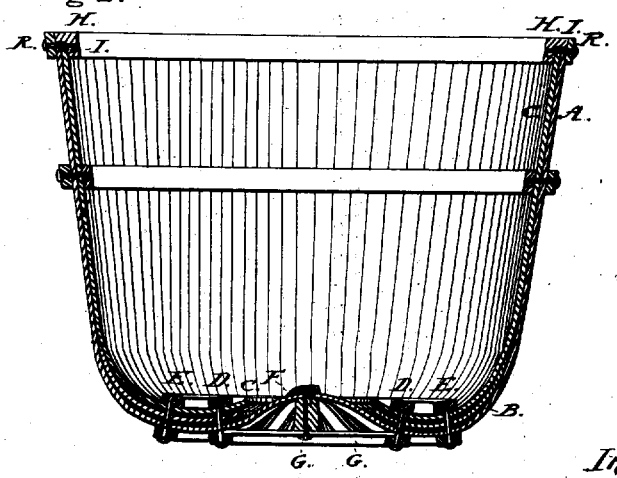

In the drawing, Figure 1 shows a top view of a device embodying my invention. Fig. 2 shows a transverse section through the diameter of the same, in which—

A represents the long standard or staves. These staves cross each other radially in the bottom, and extend to the top of the basket on all sides, dividing the circle into equal parts. B represents a short class of staves, which I may employ, but which it is not advisable to use in all cases. These staves extend from the top of the basket to the bottom hoops only, and are placed in the spaces between the outer ends of A. The number of staves A and B is such that when a convenient width is used they will nearly fill the circle of the top of the basket, coming edge to edge in the upper part of the basket; but when a very strong basket is required the staves B should be dispensed with and their places filled by using more of the long staves A. Thus the outer series of staves are arranged. C represents the staves of which the inner series are formed. These staves extend from the top of the basket to near the center of the bottom, and do not require to be placed with any reference to breaking joints with the staves in the outer series, but are made to overlap each other. Nor does it require any particular width of staves, as a greater or less number may be used, or a greater or less lap given. Thus a vast amount of care and labor is saved by making a lining for the interior of a stave basket overlapping, as described, instead of trimming the staves so as to fit edge to edge, requiring a number corresponding in number and width with the staves in the outer series, as is commonly done.

I am aware that baskets have been made of a single series of such overlapping staves, but these are objectionable on account of liability to lateral displacement and extreme roughness of the outer surface, as the staves are inclined to stand on a tangent line to the circle of the basket, preventing the outer edges from folding close upon each other; but the same cause allows the inner edges to come close and smooth. I also employ hoops and handles in constructing my basket in the usual manner of hooping and handling stave baskets, and need not be described here.

Having thus described my invention in the most exact terms that I can give, what I claim is—

The overlapping series of staves C, when used as an inside lining to a stave basket, substantially as and for the purposes hereinbefore set forth.

ROSCOE B. WHEELER.

Witnesses:

C. L. BARRON,

S. H. WHEELER.